US011736817B2

(12) United States Patent
Hasegawa (10) Patent No.: US 11,736,817 B2
(45) Date of Patent: Aug. 22, 2023

(54) SOLID-STATE IMAGING DEVICE

(71) Applicants: Kabushiki Kaisha Toshiba, Tokyo (JP); Toshiba Electronic Devices & Storage Corporation, Tokyo (JP)

(72) Inventor: Kenji Hasegawa, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 17/459,972

(22) Filed: Aug. 27, 2021

(65) Prior Publication Data
US 2022/0303507 A1   Sep. 22, 2022

(30) Foreign Application Priority Data
Mar. 18, 2021   (JP) .................. 2021-045240

(51) Int. Cl.
H04N 5/369      (2011.01)
H04N 5/378      (2011.01)
H04N 23/84      (2023.01)
H04N 25/701     (2023.01)
H04N 25/778     (2023.01)

(52) U.S. Cl.
CPC .......... *H04N 23/84* (2023.01); *H04N 25/701* (2023.01); *H04N 25/778* (2023.01)

(58) Field of Classification Search
CPC .. H04N 25/701; H04N 25/7013; H04N 25/71; H04N 25/713; H04N 25/74–75; H04N 25/76–767; H04N 25/77; H04N 25/779–78

USPC ......................................................... 348/294
See application file for complete search history.

(56) References Cited

U.S. PATENT DOCUMENTS

| | | | | |
|---|---|---|---|---|
| 5,291,292 A * | 3/1994 | Hotta | .................... | H04N 25/672 250/578.1 |
| 5,736,733 A * | 4/1998 | Shima | .................. | H04N 5/3692 250/214 SW |
| 5,774,180 A * | 6/1998 | Abe | ...................... | H04N 25/626 348/241 |
| 5,969,830 A * | 10/1999 | Kimura | ................ | H04N 5/3692 348/E3.027 |
| 8,310,577 B1 * | 11/2012 | Neter | .................. | H04N 9/04557 348/308 |

(Continued)

FOREIGN PATENT DOCUMENTS

| EP | 2552117 A2 * | 1/2013 | ............... H04N 1/03 |
|---|---|---|---|
| JP | 2006-148509 A | 6/2006 | |

(Continued)

*Primary Examiner* — Anthony J Daniels
(74) *Attorney, Agent, or Firm* — Allen & Overy LLP (57) ABSTRACT

According to one embodiment, a solid state image capturing device includes a pixel portion in which a plurality of pixels are arranged, a common signal line that transports an output signal from the pixel portion, and an output circuit that amplifies the output signal transported by using the common signal line. The pixel portion is divided into a plurality of pixel groups, the common signal line is divided into a plurality of division lines corresponding to the plurality of pixel groups, and the output circuit receives the output signals transported by using the plurality of division lines.

13 Claims, 7 Drawing Sheets

(56) References Cited

U.S. PATENT DOCUMENTS

| | | | | |
|---|---|---|---|---|
| 2010/0214461 | A1* | 8/2010 | Totsuka | H04N 9/0451 348/300 |
| 2013/0182163 | A1* | 7/2013 | Kobayashi | H01L 27/14601 348/302 |
| 2014/0131552 | A1* | 5/2014 | Tomioka | H04N 5/3694 250/208.1 |
| 2016/0044288 | A1* | 2/2016 | Kato | H04N 5/378 348/322 |
| 2018/0262640 | A1 | 9/2018 | Shima | |

FOREIGN PATENT DOCUMENTS

| | | | | |
|---|---|---|---|---|
| JP | 2009-253928 A | | 10/2009 | |
| JP | 2018-152715 A | | 9/2018 | |
| JP | 2019169842 A | * | 10/2019 | ............. H04N 5/335 |
| KR | 10-2020-0118720 A | * | 10/2020 | ............. H04N 5/369 |

* cited by examiner

Prior Art

SOLID-STATE IMAGING DEVICE

CROSS-REFERENCE TO RELATED APPLICATION

This application is based upon and claims the benefit of priority from Japanese Patent Application No. 2021-045240, filed Mar. 18, 2021, the entire contents of which are incorporated herein by reference.

FIELD

Embodiments described herein relate generally to a solid state image capturing device.

BACKGROUND

In the related art, a solid state image capturing device in which a plurality of pixels including light receiving elements such as photodiodes are arranged has been commercialized. The solid state image capturing device generates a signal charge by performing a photoelectric conversion with a light receiving element and outputs an output signal corresponding to the signal charge from the pixel. The output signal from the pixel is transmitted to an output circuit via, for example, a signal line. The output circuit amplifies the transmitted output signal and outputs the transmitted output signal to the outside of the solid state image capturing device.

Among such solid state image capturing devices, a linear image sensor in which a plurality of pixels are arranged in one direction is known. The linear image sensor has a larger ratio of the long side to the short side as compared with an image sensor in which a plurality of pixels are arranged two-dimensionally. Linear image sensors are used in, for example, copiers, facsimiles, and image scanners.

In a solid state image capturing device in which the ratio of the long side to the short side is large, the length of the signal line that the output signal reaches from the pixel to the output circuit differs corresponding to the arrangement of each pixel. When the lengths of the signal lines are different from each other, the wiring resistance and parasitic capacitances of signal lines become different from each other, and then the linearity characteristics of the pixels and source followers change. As a result, the output signal characteristics such as the brightness of the pixels may differ according to the arrangement of the pixels.

In particular, when a higher operating clock is applied in order to improve the image capturing rate of the solid state image capturing device, the influence of the wiring resistance and the parasitic capacitances of the signal line on the output signal increases, and it cannot be ignored.

Examples of related art include JP-A-2006-148509.

SUMMARY

In certain embodiments, a solid state image capturing device comprises a plurality of pixels arranged in a plurality of pixel groups. Each of the plurality of pixel groups is associated with detecting a characteristic of light that is incident on the respective pixel group. Each of the plurality of pixels in each pixel group is configured to photoelectrically generate a plurality of signal charges from the incident light, and to output a signal. The signal that is output by each of the plurality of pixels in each pixel group corresponds to an amount of the plurality of generated signal charges of a respective pixel group.

The solid state image capturing device further comprises a common signal line. The common signal line of the solid state image capturing device further comprises a plurality of division lines, each of the plurality of division lines being associated with a respective pixel group of the plurality of pixel groups. Each of the plurality of division lines is configured to transmit the plurality of output signals of the respective group to an output circuit to which the plurality of division lines are connected. The output circuit, after receiving the output plurality of output signals from the division lines to which it is connected, amplifies the plurality of output signals.

In certain embodiments, the output circuit is connected to the plurality of division lines by a plurality of lead-in lines. In such embodiments, a first lead-in line of the plurality of lead-in lines is connected is connected to a first division line of the plurality of division lines. The first lead-in line and the first division line are connected at a location that is closest to a respective output circuit of the first division line. A second lead-in line among the plurality of lead-in lines is connected to a second division line of the plurality of division lines at a location such that the second lead-in line has the same length as that of the first lead-in line.

In some embodiments, the output circuit is connected to the plurality of division lines by a plurality of lead-in lines, wherein two or more of the plurality of lead-in lines include an array portion in which the two or more lead-in lines are arranged side-by-side. The two or more lead-in lines are arrange side-by-side in a direction that intersects a first direction in which the plurality of pixels are arranged. A shield line is disposed between the two or more lead-in lines in the array portion. In further embodiments, the two or more lead-in lines are divided into a plurality of wiring layers and are arranged in the array portion.

In certain embodiments, the plurality of pixels of the solid state image capturing device are arranged in a plurality of pixel rows, each row of the plurality of pixel rows corresponding to one of a plurality of colors. A plurality of common signal lines, each of the plurality of common signal lines corresponding to one of the plurality of pixel rows, are provided. Each of the plurality of pixel rows corresponding to the plurality of colors is divided into a plurality of pixel groups. The plurality of pixel groups extends in a first direction. Each of the plurality of common signal lines is divided into a respective plurality of division lines corresponding to the plurality of pixel groups. A plurality of output circuits are provided, each of the plurality of output circuits, each of the plurality of output circuits corresponding to one color of the plurality of colors. Each output circuit of the plurality of output circuits receives the output signals transported by using the plurality of division lines, the division lines being obtained by dividing the common signal lines related to a respective color of the plurality of colors.

In further embodiments, each row of the plurality of pixel rows corresponds to one of a plurality of colors. A plurality of common signal lines are provided, each of the plurality of common signal lines corresponding to one of the plurality of pixel rows. Each of the plurality of pixel rows is divided into a plurality of pixel groups. Each of the plurality of common signal lines is divided into a plurality of division lines corresponding to the plurality of pixel groups. Each of the plurality of division lines is configured to transmit a respect output signal. A plurality of output circuits are provided, each output circuit of the plurality corresponding to one respective pixel group of the plurality of pixel groups. Each of the plurality of the output circuits and the each of the plurality of pixel groups correspond to each other at a closest physical distance therebetween, and each of the plurality of the output circuits amplifies the respective output signals related to the plurality of colors.

DETAILED DESCRIPTION

Embodiments provide a solid state image capturing device that supports high-speed read of an output signal while preventing the output signal characteristics from being different corresponding to the pixel location.

In general, according to one embodiment, a solid state image capturing device includes a pixel portion that has a pixel row, which is an array of a plurality of pixels in one direction that generate a signal charge by photoelectrically converting incident light and output an output signal corresponding to an amount of the generated signal charge, a common signal line that extends in the one direction, which transports the output signal from the pixel portion, and an output circuit that amplifies the output signal transported by using the common signal line. The pixel portion is divided into a plurality of pixel groups in the one direction, the common signal line is divided into a plurality of division lines corresponding to the plurality of pixel groups in the one direction, and the output circuit receives the output signals transported by using the plurality of division lines.

Hereinafter, embodiments will be described with reference to the drawings.

First Embodiment

Configuration

Figure 1:
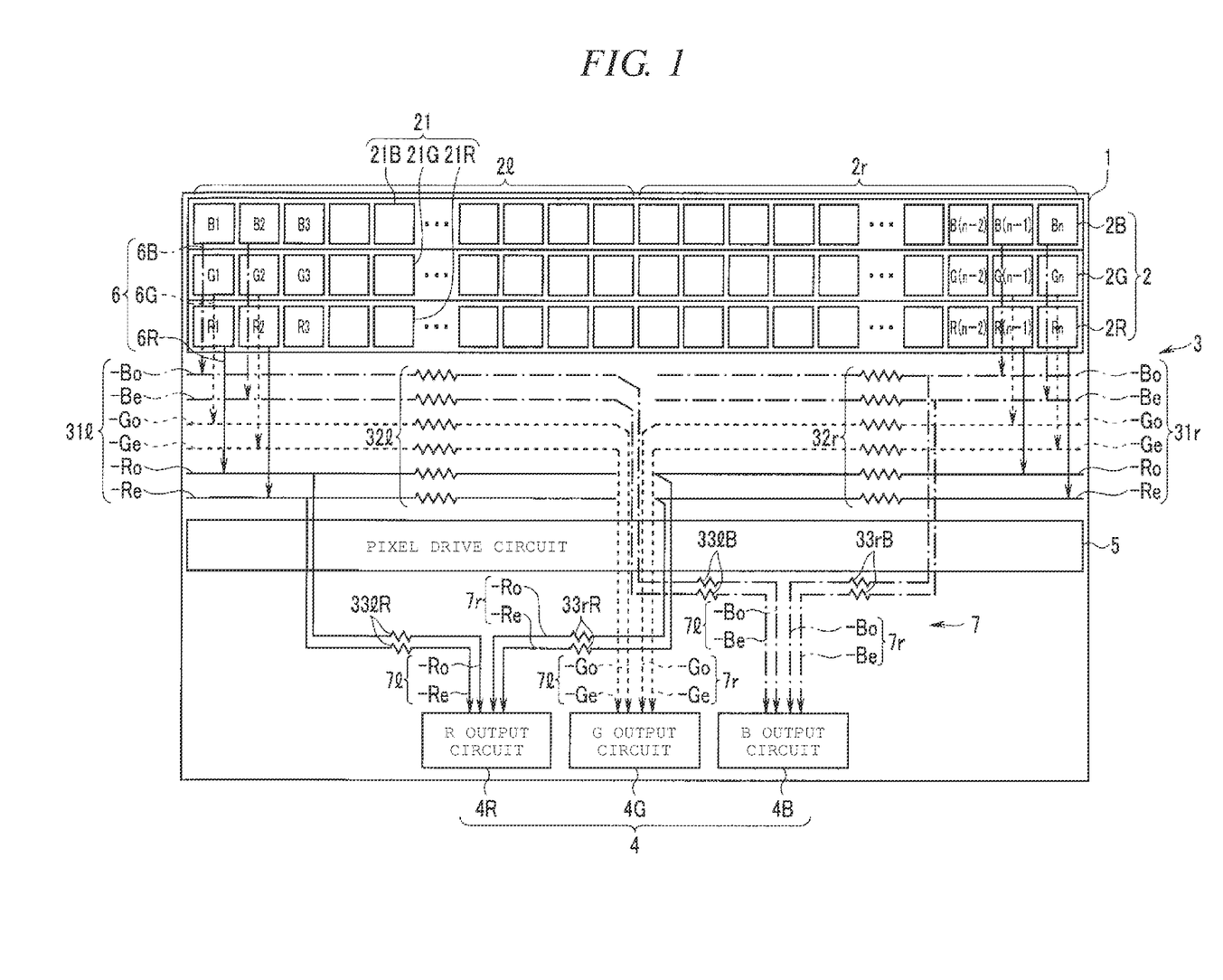
FIG. 1 is a diagram showing a configuration of a solid state image capturing device according to a first embodiment.

FIG. 1 is a diagram showing a configuration of a solid state image capturing device 1 according to a first embodiment.

The solid state image capturing device 1 is configured as an image sensor in which the ratio of the long side to the short side is large. An example of an image sensor to which the solid state image capturing device 1 is applied is a linear image sensor. Hereinafter, in the embodiment, a color linear image sensor that acquires an image of a plurality of colors will be described as an example. However, the present disclosure is not limited to this, and the configuration of the present embodiment may be applied to a monochrome linear image sensor.

The solid state image capturing device 1 includes a pixel portion 2, a common signal line 3, an output circuit 4, a pixel drive circuit 5, a read line 6, and a lead-in line 7. The solid state image capturing device 1 has, for example, a configuration in which each circuit is formed on a semiconductor substrate of one chip.

The pixel portion 2 includes a plurality of pixels 21. The pixel 21 generates a signal charge by photoelectrically converting incident light and outputting an output signal corresponding to the amount of the generated signal charge. The pixel portion 2 in the solid state image capturing device 1 of the present embodiment configured as a color linear image sensor has pixels 21 of a plurality of colors, and specifically, includes pixels 21B of a plurality of blue (B) colors, pixels 21G of a plurality of green (G) colors, and pixels 21R of a plurality of red (R) colors.

The pixel 21B is provided with a color B filter that transmits blue light of the light entering from a subject, and the blue light is photoelectrically converted. The pixel 21G is provided with a color G filter that transmits the green light of the light entering from a subject, and the green light is photoelectrically converted. The pixel 21R is provided with a color R filter that transmits red light of the light entering from a subject, and the red light is photoelectrically converted.

The plurality of pixels 21B are arranged in one direction (the long side direction of the solid state image capturing device 1) to configure a pixel row 2B. n (n is a natural number) pixels 21B are arranged in the pixel row 2B, and are represented by B1, B2, . . . , Bn in FIG. 1.

The plurality of pixels 21G are arranged in one direction to configure a pixel row 2G. n (n is a natural number) pixels 21G are arranged in the pixel row 2G, and are represented by G1, G2, . . . , Gn in FIG. 1.

The plurality of pixels 21R are arranged in one direction to configure a pixel row 2R. n (n is a natural number) pixels 21R are arranged in the pixel row 2R, and are represented by R1, R2, . . . , Rn in FIG. 1.

It is noted that in FIG. 1, three pixel rows are arranged in the order of the pixel row 2B, the pixel row 2G, and the pixel row 2R in the short side direction of the solid state image capturing device 1, the present embodiment is not limited to this, and the three pixel rows may be arranged in any order.

Figure 2:
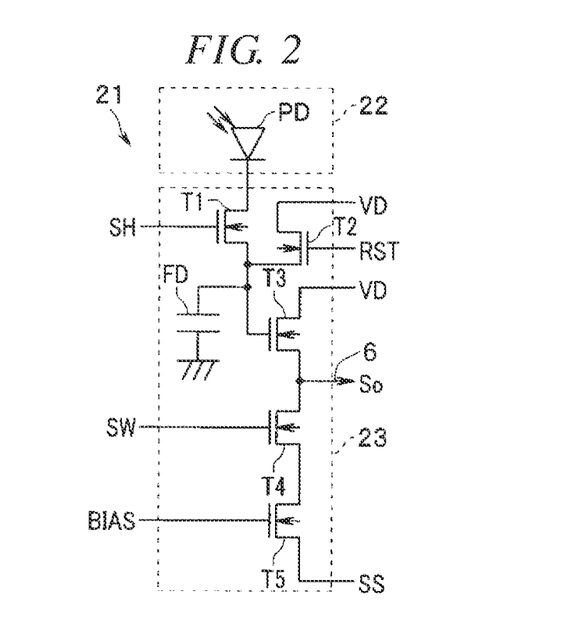
FIG. 2 is a circuit diagram showing an example of a configuration of a pixel according to the first embodiment.

FIG. 2 is a circuit diagram showing an example of a configuration of the pixel 21.

The pixel 21 includes a light receiving unit 22 and a charge detection unit 23.

The light receiving unit 22 includes a photodiode PD which is a light receiving element. When the photodiode PD receives light from the outside, the photodiode PD performs a photoelectric conversion and stores a signal charge generated by using the photoelectric conversion.

The charge detection unit 23 includes a transfer transistor T1, a floating diffusion FD, a reset transistor T2, a source follower input gate T3, a switching transistor T4, and a source follower constant current source transistor T5.

The transfer transistor T1, the reset transistor T2, the source follower input gate T3, the switching transistor T4, and the source follower constant current source transistor T5 are each configured with, for example, an n-type MOS transistor. However, the configuration is not limited to this, and the transfer transistor T1, the reset transistor T2, the source follower input gate T3, the switching transistor T4, and the source follower constant current source transistor T5 may be configured with a p-type MOS transistor.

The cathode of the photodiode PD is connected to a source of the transfer transistor T1. A gate of the transfer transistor T1 is connected to the pixel drive circuit 5, and a drain of the transfer transistor T1 is connected to a gate of the source follower input gate T3. A sample hold signal SH is input from the pixel drive circuit 5 to the gate of the transfer transistor T1. When the sample hold signal SH is input, the transfer transistor T1 reads the signal charge stored in the photodiode PD and transfers the signal charge to the floating diffusion FD.

The floating diffusion FD is provided between the transfer transistor T1 and the source follower input gate T3. The floating diffusion FD stores the signal charge transferred from the photodiode PD.

A source of the reset transistor T2 is connected to the floating diffusion FD. A gate of the reset transistor T2 is connected to the pixel drive circuit 5 and a drain of the reset transistor T2 is connected to a high potential VD. When the reset signal RST is input from the pixel drive circuit 5 to the gate of the reset transistor T2 at a predetermined timing, the reset transistor T2 connects the floating diffusion FD and the high potential VD and resets the signal charge of the floating diffusion FD.

A drain of the source follower input gate T3 is connected to the high potential VD and a source of the source follower input gate T3 is connected to the switching transistor T4. The source follower input gate T3 performs a source follower operation and outputs an output signal So having a potential corresponding to the potential of the floating diffusion FD to the source.

A gate of the switching transistor T4 is connected to the pixel drive circuit 5, and a source of the switching transistor T4 is connected to a drain of the source follower constant current source transistor T5. A drive signal SW is input from the pixel drive circuit 5 to the gate of the switching transistor T4. When the drive signal SW is input, the switching transistor T4 is switched to either an ON state or an OFF state. When the switching transistor T4 enters an ON state, the source follower constant current source transistor T5 is connected to the source follower input gate T3. When the switching transistor T4 enters an OFF state, the source follower constant current source transistor T5 is disconnected to the source follower input gate T3.

A gate of the source follower constant current source transistor T5 is connected to a bias potential BIAS, and a source of the source follower constant current source transistor T5 is connected to a low potential SS. When the source follower constant current source transistor T5 is connected to the source follower input gate T3, a constant current corresponding to the bias potential BIAS is supplied to the source follower input gate T3.

A read line 6 is connected between the source of the source follower input gate T3 and the drain of the switching transistor T4. Therefore, a constant current output signal So having a potential corresponding to the potential of the floating diffusion FD is output from the read line 6. That is, the signal charge generated by the photodiode PD is converted into a voltage corresponding to the amount of the signal charge, and the converted voltage is output as the output signal So.

As shown in FIG. 1, the read line 6 is connected to each of the plurality of pixels 21, and the read line 6 is connected to a common signal line 3. The read line 6 connected to the pixel row 2B is referred to as a read line 6B, the read line 6 connected to the pixel row 2G is referred to as a read line 6G, and the read line 6 connected to the pixel row 2R is referred to as a read line 6R.

The common signal line 3 extends in a first direction, which is the arrangement direction of the pixel rows 2B, 2G, and 2R. A plurality of common signal lines 3 are provided corresponding to the pixel rows 2B, 2G, and 2R of a plurality of colors, and the common signal line 3 transports the output signal So, which is output from the pixel portion 2 via the read line 6.

The pixel portion 2 is divided into a plurality of pixel groups the first direction, and in the present embodiment, the pixel portion 2 is divided into a pixel group 2*l* on the left side and a pixel group 2*r* on the right side.

The common signal line 3 is divided into division lines 31*l* on the left side corresponding to the pixel group 2*l* and division lines 31*r* on the right side corresponding to the pixel group 2*r*, in the first direction. The left and right division lines 31*l* and 31*r* correspond to the three colors of R (red), G (green), and B (blue), respectively, and six division lines are provided corresponding to the odd-numbered and even-numbered locations in the arrays of pixels 21 for each color.

Specifically, regarding the pixel group 2*l* of the pixel row 2B, the division lines 31*l* include a division line 31*l*-Bo, which is connected to the read line 6B of the odd-numbered pixel 21B, and a division line 31*l*-Be, which is connected to the read line 6B of the even-numbered pixel 21B.

Regarding the pixel group 2*l* of the pixel row 2G, the division lines 31*l* include a division line 31*l*-Go, which is connected to the read line 6G of the odd-numbered pixel 21G, and a division line 31*l*-Ge, which is connected to the read line 6G of the even-numbered pixel 21G.

Regarding the pixel group 2*l* of the pixel row 2R, the division lines 31*l* include a division line 31*l*-Ro, which is connected to the read line 6R of the odd-numbered pixel 21R, and a division line 31*l*-Re, which is connected to the read line 6R of the even-numbered pixel 21R.

Regarding the pixel group 2*r* of the pixel row 2B, the division lines 31*r* include a division line 31*r*-Bo, which is connected to the read line 6B of the odd-numbered pixel 21B, and a division line 31*r*-Be, which is connected to the read line 6B of the even-numbered pixel 21B.

Regarding the pixel group 2*r* of the pixel row 2G, the division lines 31*r* include a division line 31*r*-Go, which is connected to the read line 6G of the odd-numbered pixel 21G, and a division line 31*r*-Ge, which is connected to the read line 6G of the even-numbered pixel 21G.

Regarding the pixel group 2*r* of the pixel row 2R, the division lines 31*r* include a division line 31*r*-Ro, which is connected to the read line 6R of the odd-numbered pixel 21R, and a division line 31*r*-Re, which is connected to the read line 6R of the even-numbered pixel 21R.

The output signals So that are transported by the plurality of division lines 31*l* and 31*r* are input to the output circuit 4, and the output signals So are amplified.

A plurality of output circuits 4 are provided, each of the plurality of output circuits 4 corresponding to a plurality of colors. A B output circuit 4B that amplifies the output signal So from the pixel 21B, a G output circuit 4G that amplifies the output signal So from the pixel 21G, and an R output circuit 4R that amplifies the output signal So from the pixel 21R are provided. In the arrangement example in FIG. 1, the B output circuit 4B is disposed on the right side in the one direction, the G output circuit 4G is disposed in the center in the one direction, and the R output circuit 4R is disposed on the left side in the one direction.

The division line 31*l*-Bo is connected to the B output circuit 4B via a lead-in line 7*l*-Bo, the division line 31*l*-Be is connected to the B output circuit 4B via a lead-in line 7*l*-Be, the division line 31*r*-Bo is connected to the B output circuit 4B via a lead-in line 7*r*-Bo, and the division line 31*r*-Be is connected to the B output circuit 4B via the lead-in line 7*r*-Be. Therefore, the output signals So from all the pixels 21B on the pixel row 2B are input to the B output circuit 4B.

The division line 31*l*-Go is connected to the G output circuit 4G via a lead-in line 7*l*-Go, the division line 31*l*-Ge is connected to the G output circuit 4G via a lead-in line 7*l*-Ge, the division line 31*r*-Go is connected to the G output circuit 4G via a lead-in line 7*r*-Go, and the division line 31*r*-Ge is connected to the G output circuit 4G via the lead-in line 7*r*-Ge. Therefore, the output signals So from all the pixels 21G on the pixel row 2G are input to the G output circuit 4G.

The division line 31*l*-Ro is connected to the R output circuit 4R via a lead-in line 7*l*-Ro, the division line 31*l*-Re is connected to the R output circuit 4R via a lead-in line 7*l*-Re, the division line 31*r*-Ro is connected to the R output circuit 4R via a lead-in line 7*r*-Ro, and the division line 31*r*-Re is connected to the R output circuit 4R via the lead-in line 7*r*-Re. Therefore, the output signals So from all the pixels 21R on the pixel row 2R are input to the R output circuit 4R.

The pixel drive circuit 5 is configured as, for example, a digital circuit. As described above, the pixel drive circuit 5 drives the pixel portion 2 by supplying the sample hold signal SH, the reset signal RST, the drive signal SW, and the like to each pixel 21 at an appropriate timing.

The pixel drive circuit 5 drives and controls each pixel 21 as follows, for example.

The pixel drive circuit 5 resets the photodiode PD by supplying the reset signal RST to the pixel 21 and cause the photodiode PD to store the signal charge by stopping the supply of the reset signal RST. When a predetermined charge storing time elapses, the pixel drive circuit 5 transfers the signal charge that is stored in the photodiode PD to the floating diffusion FD by supplying the sample hold signal SH to the pixel 21 and ends the storing of the signal charge. After that, the pixel drive circuit 5 outputs the output signal So from the pixel 21 to the read line 6 by supplying the drive signal SW to the pixel 21.

At that time, the pixel drive circuit 5 drives the pixel 21B having color B, the pixel 21G having color G, and the pixel 21R having color R, for example, at the same time (that is, in parallel). As a result, for example, the first pixel 21B (B1) in the pixel row 2B, the first pixel 21G (G1) in the pixel row 2G, and the first pixel 21R (R1) in the pixel row 2R are driven and read at the same time.

Further, the pixel drive circuit 5 drives the pixels 21B, 21G, and 21R in the pixel rows 2B, 2G, and 2R in the arrangement order (that is, sequentially) for one color. Therefore, taking color B as an example, the pixel drive circuit 5 drives the first pixel 21B (B1) in the pixel row 2B, and drives the second pixel 21B (B2) in the pixel row 2B in the order. As a result, in the pixel row 2B, the pixels are driven and read in the order of B1, B2, . . . , Bn. However, the driving method is not limited to the one described here, and each pixel 21 may be read by another driving method.

Figure 9:
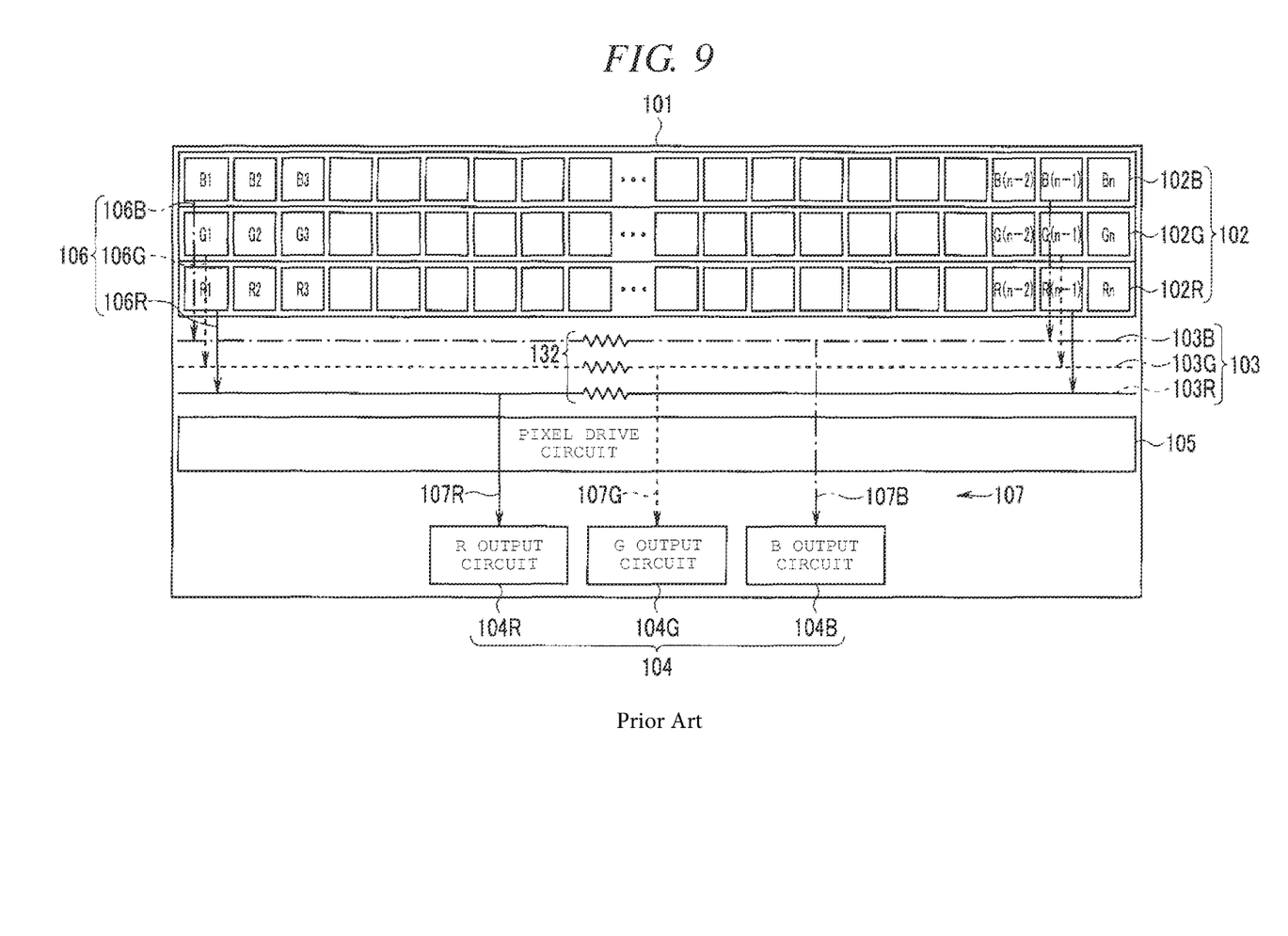
FIG. 9 is a diagram showing a configuration of a solid state image capturing device according to a comparative example.

FIG. 9 is a diagram showing a configuration of the solid state image capturing device 101 according to a comparative example.

The solid state image capturing device 101 of the comparative example includes a pixel portion 102, a common signal line 103, an output circuit 104, a pixel drive circuit 105, a read line 106, and a lead-in line 107.

The pixel portion 102 includes a pixel row 102B in which pixels for photoelectrically converting the blue light are arranged, a pixel row 102G in which pixels for photoelectrically converting the green light are arranged, and a pixel row 102R in which pixels for photoelectrically converting the red light are arranged. The pixel circuit of the pixel portion 102 is similar to the configuration shown in FIG. 2.

The read line 106 includes a read line 106B, a read line 106G, and a read line 106R. The common signal line 103 includes a common signal line 103B, a common signal line 103G, and a common signal line 103R. Each pixel of the pixel row 102B is connected to the common signal line 103B via the read line 106B. Each pixel of the pixel row 102G is connected to the common signal line 103G via the read line 106G. Each pixel of the pixel row 102R is connected to the common signal line 103R via the read line 106R.

The output circuit 104 includes a B output circuit 104B, a G output circuit 104G, and an R output circuit 104R. The lead-in line 107 includes a lead-in line 107B, a lead-in line 107G, and a lead-in line 107R. The common signal line 103B is connected to the B output circuit 104B via the lead-in line 107B. The common signal line 103G is connected to the G output circuit 104G via the lead-in line 107G. The common signal line 103R is connected to the R output circuit 104R via the lead-in line 107R.

In such a configuration, the common signal line 103 has a wiring resistance corresponding to the length of the wiring and parasitic capacitances corresponding to the length of the wiring in the array portion when other wirings are arranged side by side in close proximity. Further, the common signal lines 103B, 103G, and 103R have parasitic capacitances caused by transistors T1 to T5 in each of the pixels of the pixel rows 102B, 102G, and 102R that are connected to the common signal lines 103B, 103G, 103R, respectively. Due to such wiring resistance and parasitic capacitances 132, a delay occurs in the output signal transported via the common signal line 103. The delay of the output signal becomes a hindrance of the high-speed read operation of the solid state image capturing device 101.

In contrast to this, in order to speed up the read as compared with the solid state image capturing device 101 in FIG. 9, the solid state image capturing device 1 of the present embodiment shown in FIG. 1 connects (parallelization of the common signal lines 3) the odd-numbered pixels and the even-numbered pixels to different common signal lines 3 and divides the common signal line 3 in one direction into, for example, left and right division lines 31*l* and 31*r* (division of the common signal line 3).

Further, in the present embodiment, in order to prevent the difference in delay time corresponding to the pixel location, the number of pixels belonging to the pixel group 2*l* on the left side and the number of pixels belonging to the pixel group 2*r* on the right side are made to be substantially the same. Specifically, when n is an even number, both the number of pixels belonging to the pixel group 2*l* and the number of pixels belonging to the pixel group 2*r* on the right side may be set to be n/2. Further, when n is an odd number, one of the number of pixels belonging to the pixel group 2*l* and the number of pixels belonging to the pixel group 2r on the right side may be set to be (n+1)/2 and the other may be set to be (n−1)/2.

By applying this configuration, the lengths of the division lines 31*l* and 31*r* are substantially half the length and substantially the same length of the common signal line 103 of the comparative example, so that the wiring resistance and parasitic capacitances corresponding to the length of the wiring can be reduced as compared with the comparative example. Further, since the number of pixels connected to the division lines 31*l* is substantially half the number of pixels connected to the common signal lines 103 of the comparative example, the parasitic capacitances caused by the transistors T1 to T5 and the like can be reduced.

In FIG. 1, the wiring resistance and parasitic capacitances related to the division lines 31*l* are represented by a reference numeral 32*l*, and the wiring resistance and parasitic capacitances related to the division lines 31*r* are represented by a reference numeral 32*r*. The wiring resistance and parasitic capacitances 32*l* of the division lines 31*l* and the wiring resistance and parasitic capacitances 32*r* of the division lines 31*r* are both smaller than the wiring resistance and parasitic capacitances 132 of the comparative example. Therefore, the delay of the output signal So is reduced as compared with the comparative example, and the read speed of the solid state image capturing device 1 can be increased.

Further, in the present embodiment, even when the pixel locations are different, the difference in the delay time of the output signal So due to the lead-in line 7 is prevented from occurring as much as possible.

That is, the B output circuit 4B disposed on the right side is far from the division lines 31*l*-Bo and 31*l*-Be and close to the division lines 31*r*-Bo and 31*r*-Be. The lead-in lines 7*l*-Bo and 7*l*-Be are connected to the division lines 31*l*-Bo and 31*l*-Be, respectively, at the locations closest to the B output circuit 4B of the division lines 31*l*-Bo and 31*l*-Be, that is, at the right ends of the division lines 31*l*-Bo and 31*l*-Be.

Further, the lead-in lines 7*r*-Bo and 7*r*-Be are connected to the division lines 31*r*-Bo and 31*r*-Be, respectively, at the locations such that the lead-in lines 7*r*-Bo and 7*r*-Be have the same lengths as the lead-in lines 7*l*-Bo and 7*l*-Be.

With this configuration, the wiring resistance and parasitic capacitances 33*l*B of the lead-in lines 7*l*-Bo and 7*l*-Be can be set to substantially the same value as the wiring resistance and parasitic capacitances 33*r*B of the lead-in lines 7*r*-Bo and 7*r*-Be, and the difference in delay time due to the lead-in lines 7*l* and 7*r* is reduced.

On the other hand, the R output circuit 4R disposed on the left side is close to the division lines 31*l*-Ro and 31*l*-Re and far from the division lines 31*r*-Ro and 31*r*-Re. The lead-in lines 7*r*-Ro and 7*r*-Re are connected to the division lines 31*r*-Ro and 31*r*-Re, respectively, at the locations closest to the R output circuit 4R of the division lines 31*r*-Ro and 31*r*-Re, that is, at the left ends of the division lines 31*r*-Ro and 31*r*-Re.

Further, the lead-in lines 7*l*-Ro and 7*l*-Re are connected to the division lines 31*l*-Ro and 31*l*-Re, respectively, at the locations such that the lead-in lines 7*l*-Ro and 7*l*-Re have the same lengths as the lead-in lines 7*r*-Ro and 7*r*-Re.

With this configuration, the wiring resistance and parasitic capacitances 33*l*R of the lead-in lines 7*l*-Ro and 7*l*-Re can be set to substantially the same value as the wiring resistance and parasitic capacitances 33*r*R of the lead-in lines 7*r*-Ro and 7*r*-Re, and the difference in delay time due to the lead-in lines 7*l* and 7*r* is reduced.

It is noted that the G output circuit 4G disposed in the center is close to both the division lines 31*l*-Go and 31*l*-Ge and the division lines 31*r*-Go and 31*r*-Ge. The lead-in lines 7*l*-Go and 7*l*-Ge are connected to the division lines 31*l*-Go and 31*l*-Ge, respectively, at the locations closest to the G output circuit 4G of the division lines 31*l*-Go and 31*l*-Ge, that is, at the right ends of the division lines 31*l*-Go and 31*l*-Ge, the lead-in lines 7*r*-Go and 7*r*-Ge to are connected to the division lines 31*r*-Go and 31*r*-Ge, respectively, at the locations closest to the G output circuit 4G of the division lines 31*r*-Go and 31*r*-Ge, that is, at the left ends of the division lines 31*r*-Go and 31*r*-Ge, and the lead-in lines 7*l*-Go, 7*l*-Ge, 7*r*-Go, and 7*r*-Ge are minimized by arranging the lead-in lines 7*l*-Go, 7*l*-Ge, 7*r*-Go, and 7*r*-Ge in a direction orthogonal to one direction and connecting the lead-in lines 7*l*-Go, 7*l*-Ge, 7*r*-Go, and 7*r*-Ge to the G output circuit 4G. As a result, the wiring resistance and parasitic capacitances of each of the lead-in lines 7*l*-Go, 7*l*-Ge, 7*r*-Go, and 7*r*-Ge connected to the G output circuit 4G can be almost ignored.

Further, since the read lines 6 are arranged in a direction orthogonal to the one direction (short side direction of the solid state image capturing device 1) so as to connect the pixels 21 and the common signal lines 3 at the shortest distance, the wiring resistance and parasitic capacitances can be almost ignored.

According to the first embodiment, in addition to the parallelization that makes the common signal line 3 different for each color of pixel 21, by performing parallelization in which the common signal line 3 is made different corresponding to whether the order in the array of the pixels 21 is odd-numbered or even-numbered and dividing the common signal line 3 into division lines 31*l* and 31*r* in one direction, it is possible to reduce the wiring resistance and parasitic capacitances of each one of the division lines 31*l* and 31*r*, prevent the delay of the output signal So, and speed up the read operation of the solid state image capturing device 1.

In this case, for each color, since the lengths of the wirings of the division line 31*l* and the division line 31*r* are made to be substantially equal, the wiring resistance and parasitic capacitances of the division line 31*l* can be equalized with the wiring resistance and parasitic capacitances of the division line 31*r*. Further, for each color, since the lengths of the wirings of the lead-in line 7*l* and the lead-in line 7*r* are made to be substantially equal, the wiring resistance and parasitic capacitances of the lead-in line 7*l* can be equalized with the wiring resistance and parasitic capacitances of the lead-in line 7*r*. As a result, it is possible to reduce the difference in output signal characteristics corresponding to the pixel location. Therefore, for example, it is possible to reduce the difference in the brightness value corresponding to the pixel location and improve the image quality of the acquired image.

Further, since the array portion in which the plurality of lead-in lines 7 are arranged side by side is minimized, the expansion of the wiring region can be reduced.

Second Embodiment

Figure 3:
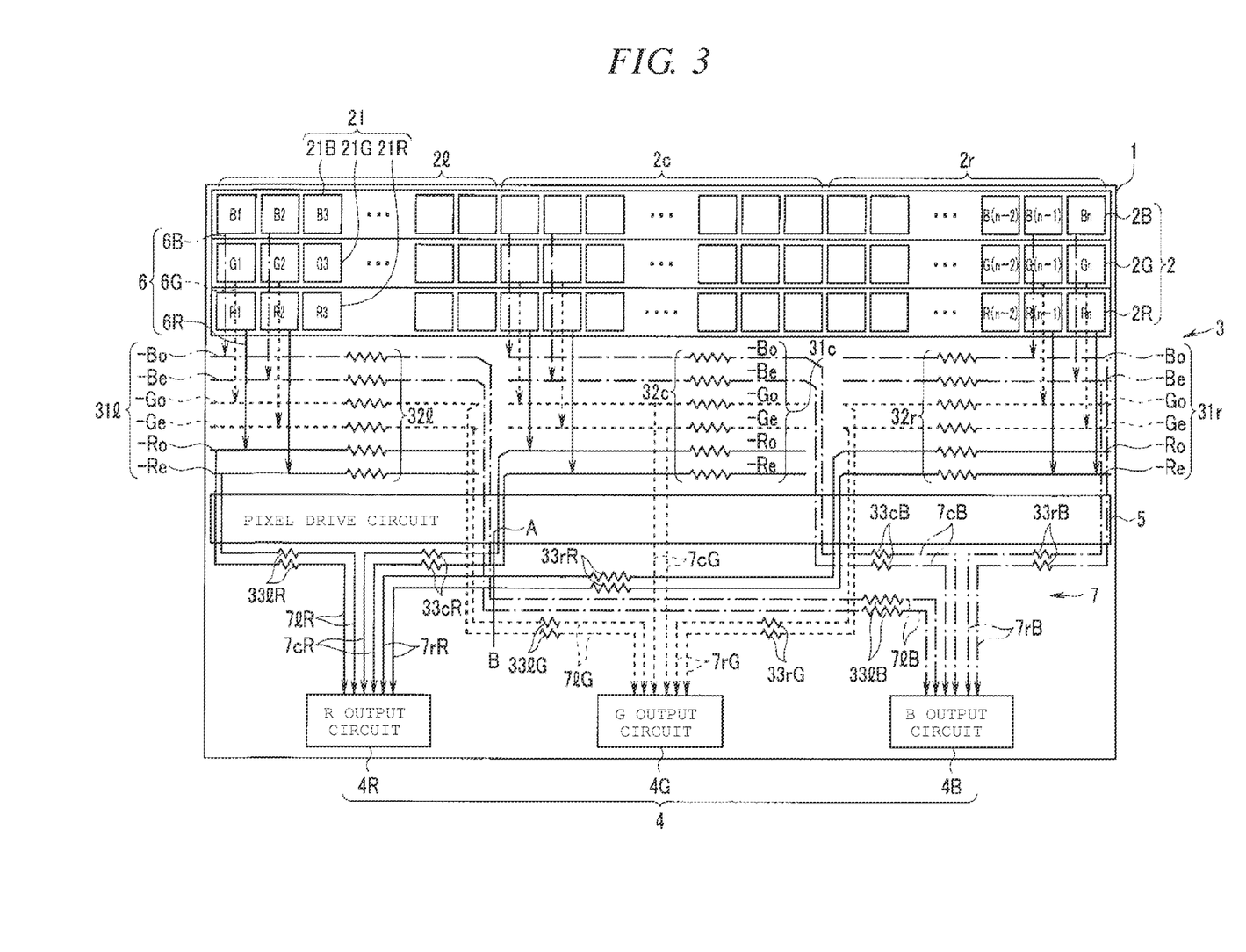
FIG. 3 is a diagram showing a configuration of a solid state image capturing device according to a second embodiment.

FIG. 3 is a diagram showing a configuration of a solid state image capturing device 1 according to a second embodiment. In the second embodiment, the same parts as those in the first embodiment are designated by the same reference numerals, the description thereof will be omitted, and the differences will be mainly described.

The pixel portion 2 of the present embodiment is divided into three pixel groups in one direction. The pixel portion 2 is divided into a pixel group 2*l* on the left side, a pixel group 2*c* in the center, and a pixel group 2*r* on the right side. As described above, it is preferable to divide the pixels equally so that the number of pixels belonging to the pixel groups 2*l*, 2*c*, and 2*r* is substantially the same.

The common signal line 3 is divided into division lines 31*l* on the left side corresponding to the pixel group 2*l*, division lines 31*c* in the center corresponding to the pixel group 2*c*, and division lines 31*r* on the right side corresponding to the pixel group 2*r*, in one direction. Similar to the first embodiment, the division lines 31*l*, 31*c*, and 31*r* are parallelized to six for each color (RGB) and corresponding to whether the order is odd-numbered (o) or even-numbered (e). It is noted that in FIG. 3, the wiring resistance and the parasitic capacitances related to the division lines 31*c* are represented by a reference numeral 32*c*.

In the arrangement example in FIG. 3, the B output circuit 4B is disposed at a location corresponding to the center of the division lines 31*r* on the right side, the G output circuit 4G is disposed at a location corresponding to the center of the division lines 31*c* in the center, and the R output circuit 4R is disposed at a location corresponding to the center of the division lines 31*l* on the left side.

Two of the division lines 31*l* related to color B are connected to the B output circuit 4B via two of the lead-in lines 7*l*B, two of the division lines 31*c* related to color B are connected to the B output circuit 4B via two of the lead-in lines 7*c*B, and two of the division lines 31*r* related to color B are connected to the B output circuit 4B via two of the lead-in lines 7*r*B.

Two of the division lines 31*l* related to color G are connected to the G output circuit 4G via two of the lead-in lines 7*l*G, two of the division lines 31*c* related to color G are connected to the G output circuit 4G via two of the lead-in lines 7*c*G, and two of the division lines 31*r* related to color G are connected to the G output circuit 4G via two of the lead-in lines 7*r*G.

Two of the division lines 31*l* related to color R are connected to the R output circuit 4R via two of the lead-in lines 7*l*R, two of the division lines 31*c* related to color R are connected to the R output circuit 4R via two of the lead-in lines 7*c*R, and two of the division lines 31*r* related to color R are connected to the R output circuit 4R via two of the lead-in lines 7*r*R.

Regarding the color B, the first lead-in lines 7*c*B are connected to the first division lines 31*c* at locations (right end) closest to the B output circuit 4B of the first division lines 31*c*, and the second lead-in lines 7*r*B are connected to the second division lines 31*r* at locations such that second lead-in lines 7*r*B have the same lengths as the first lead-in lines 7*c*B. Further, the third lead-in lines 7*l*B are connected to the third division lines 31*l* at locations (right end) closest to the B output circuit 4B of the third division lines 31*l*.

Regard the color B, the wiring resistance and parasitic capacitances 33*c*B of the first lead-in lines 7*c*B are substantially equal to the wiring resistance and parasitic capacitances 33*r*B of the second lead-in lines 7*r*B, and smaller than the wiring resistance and parasitic capacitances 33*l*B of the third lead-in lines 7*l*B.

Regarding the color R, the first lead-in lines 7*c*R are connected to the first division lines 31*c* at locations (left end) closest to the R output circuit 4R of the first division lines 31*c*, and the second lead-in lines 7*l*R are connected to the second division lines 31*l* at locations such that second lead-in lines 7*l*R have the same lengths as the first lead-in lines 7*c*R. Further, the third lead-in lines 7*r*R are connected to the third division lines 31*r* at locations (left end) closest to the R output circuit 4R of the third division lines 31*r*.

Regard the color R, the wiring resistance and parasitic capacitances 33*c*R of the first lead-in lines 7*c*R are substantially equal to the wiring resistance and parasitic capacitances 33*l*R of the second lead-in lines 7*l*R, and smaller than the wiring resistance and parasitic capacitances 33*r*R of the third lead-in lines 7*r*R.

Regarding the color G, the first lead-in lines 7*l*G are connected to the first division lines 31*l* at locations (right end) closest to the G output circuit 4G of the first division lines 31*l*, the second lead-in lines 7*r*G are connected to the second division lines 31*r* at locations (left end) closest to the G output circuit 4G of the second division lines 31*r*, and the third lead-in lines 7*c*G are connected to the third division lines 31*c* at locations (center) closest to the G output circuit 4G of the third division lines 31*c*.

Regarding the color G, the wiring resistance and parasitic capacitances 33*l*G of the first lead-in lines 7*l*G are substantially equal to the wiring resistance and parasitic capacitances 33*r*G of the second lead-in lines 7*r*G. Further, the wiring resistance and parasitic capacitances of the third lead-in lines 7*c*G can be almost ignored.

In this way, in each color, by making the wiring resistance and parasitic capacitances of at least two types of lead-in lines substantially equal, among the lead-in lines 7*l*, 7*c*, and 7*r* with three types of the left side, center, and right side, the difference in output signal characteristics corresponding to the pixel location is reduced.

Figure 4:
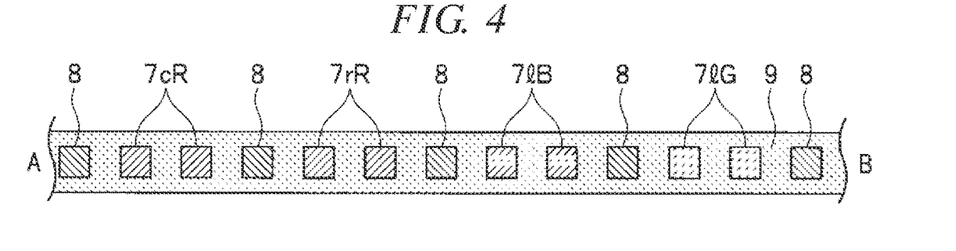
FIG. 4 is a cross-sectional diagram showing an example in which a wiring on the line A-B in FIG. 3 is configured on the same plane, in the second embodiment.

FIG. 4 is a cross-sectional diagram showing an example in which a wiring on the line A-B in FIG. 3 is configured on the same plane.

In a wiring layout shown in FIG. 3, two or more lead-in lines 7*l*, 7*c*, 7*r* among the plurality of lead-in lines 7*l*, 7*c*, 7*r*, are arranged side by side in a direction intersecting one direction to form an array portion. FIG. 4 shows a cross section of the array portion in the direction intersecting the one direction (A-B direction).

On the line A-B, the lead-in lines 7*c*R, the lead-in lines 7*r*R, the lead-in lines 7*l*B, and the lead-in lines 7*l*G are arranged in order from A to B in one insulating layer of a substrate 9. At this time, interference between wirings is reduced by arranging the shield lines 8 between these lead-in lines 7*c*R, 7*r*R, 7*l*B, and 7*l*G, on the left side of the lead-in line 7*c*R, and the right side of the lead-in line 7*l*G.

However, when the planar wiring as shown in FIG. 4 is applied, the substrate area increases. Therefore, it is preferable to apply the wiring layout as shown in FIG. 5.

Figure 5:
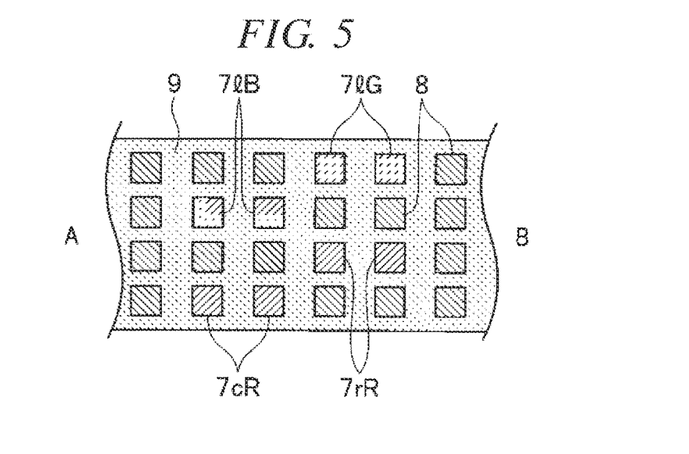
FIG. 5 is a cross-sectional diagram showing an example in which the wirings on the line A-B in FIG. 3 are stacked, in the second embodiment.

FIG. 5 is a cross-sectional diagram showing an example in which the wirings on the line A-B in FIG. 3 are stacked.

FIG. 5 shows a cross section in the A-B direction when the lead-in lines 7*l*, 7*c*, and 7*r* are divided into a plurality of wiring layers and arranged in an array portion of two or more lead-in lines 7*l*, 7*c*, and 7*r*.

For example, a four-layer structure of the wiring layers stacked in the substrate 9 is applied in which the lead-in lines 7*c*R are arranged in a first layer, the lead-in lines 7*r*R are arranged in a second layer, the lead-in lines 7*l*B are arranged in a third layer, and the lead-in lines 7*l*G are arranged in a fourth layer.

At this time, the locations of the lead-in lines 7*r*R in the A-B direction are shifted so as not to overlap with the lead-in lines 7*c*R, the locations of the lead-in lines 7*l*B in the A-B direction are shifted so as not to overlap with the lead-in lines 7rR, and the locations of the lead-in lines 7lG in the A-B direction are shifted so as not to overlap with the lead-in lines 7lB.

Further, in order to reduce the area of the substrate 9 in the A-B direction, the locations of the lead-in lines 7cR of the first layer and the lead-in lines 7lB of the third layer in the A-B direction are made the same, and the locations of the lead-in lines 7rR of the second layer and the lead-in lines 7lG of the fourth layer in the A-B direction are made the same.

The shield lines 8 are arranged on the top, bottom, left, and right of each of the lead-in lines 7cR, 7rR, 7lB, and 7lG to reduce the interference between the wirings of the lead-in lines 7cR, 7rR, 7lB, and 7lG.

It is noted that the three-dimensional wiring in the thickness direction of the substrate 9 as shown in FIG. 5 can be widely applied to an array portion in which a plurality of lead-in lines 7 are arranged side by side in the short side direction of the solid state image capturing device 1. Therefore, the configuration of the three-dimensional wiring and the configuration in which the shield line 8 is arranged may be applied to the configuration of the first embodiment described above.

Figure 6:
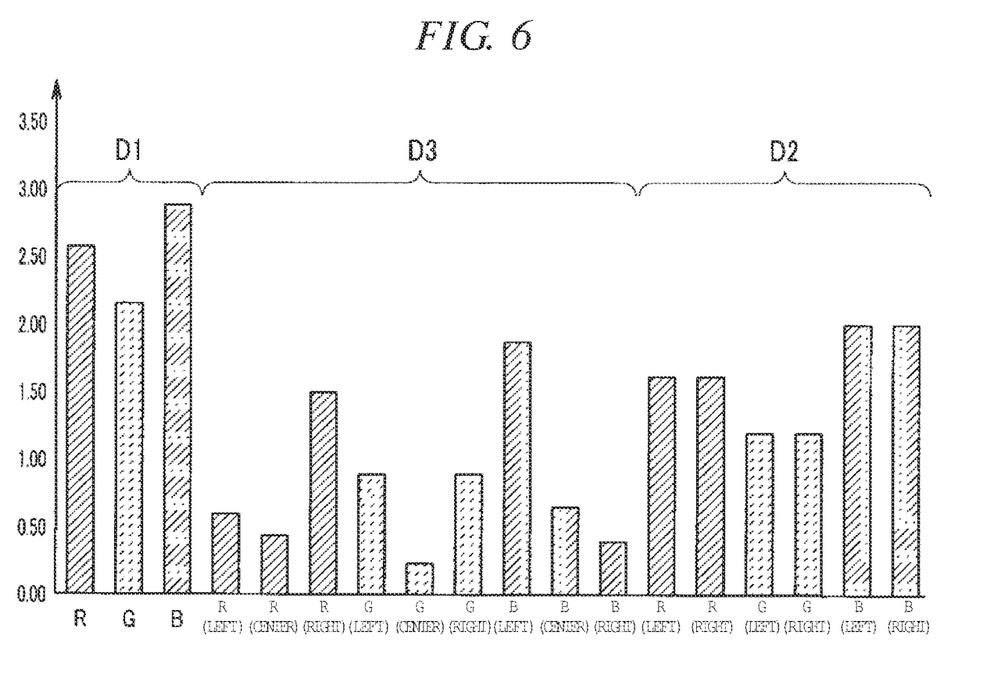
FIG. 6 is a bar graph showing delay time due to the wiring resistance and parasitic capacitances of common signal lines divided into two and three according to the first and second embodiments, in comparison with delay time due to the wiring resistance and parasitic capacitances of undivided common signal lines.

FIG. 6 is a bar graph showing the delay time due to the wiring resistance and parasitic capacitances of common signal lines 3 divided into two and three according to the first and second embodiments, in comparison with the delay time due to the wiring resistance and parasitic capacitances of undivided common signal lines 3. It is noted that the vertical axis in FIG. 6 indicates the relative delay time.

In FIG. 6, D1 shows a case where the common signal line 3 is not divided, D2 shows a case where the common signal line 3 is divided into two, and D3 shows a case where the common signal line 3 is divided into three.

When the common signal line 3 is not divided, as shown in D1, there is a variation in the delay time corresponding to the color (R, G, B), and there is delay time of substantially 2.2 to 2.9.

When the common signal line 3 is divided into two, as shown in D2, there is a variation in the delay time corresponding to the color (R, G, B), and there is almost no variation in the delay time corresponding to the arrangement (left, right). In D2, the delay time is within substantially 1.2 to 2.0, and the delay time is shorter than that in D1 in all colors.

When the common signal line 3 is divided into three, as shown in D3, not only is there a variation in delay time corresponding to the color (R, G, B), but there is also a variation in delay time corresponding to the arrangement (left, center, right). In D3, the delay time is further shortened as compared with D2 in any arrangement for any color.

In this way, it can be seen that the two-division method in the first embodiment implements a higher-speed read operation of the solid state image capturing device 1 as compared with the no-division method, and the three division method in the second embodiment implements a higher-speed read operation of the solid state image capturing device 1 as compared with the no-division and two-division methods.

According to the second embodiment, since the effect is almost the same as that of the first embodiment described above and the number of divisions of the common signal line 3 is larger than that of the first embodiment, the delay time when the output signal So is read can be shortened as compared with the first embodiment.

Further, the expansion of the wiring region and the increase in the substrate area due to the increase in the number of divisions and the number of lead-in lines 7 can be prevented by making the wiring layers multi-layered as shown in FIG. 5. By reducing the substrate area, the increase in cost is reduced.

Further, since the shield line is provided in the array portion of the lead-in lines 7, it is possible to reduce the interference between the wirings and reduce the deterioration of the quality of the output signal So.

Figure 7:
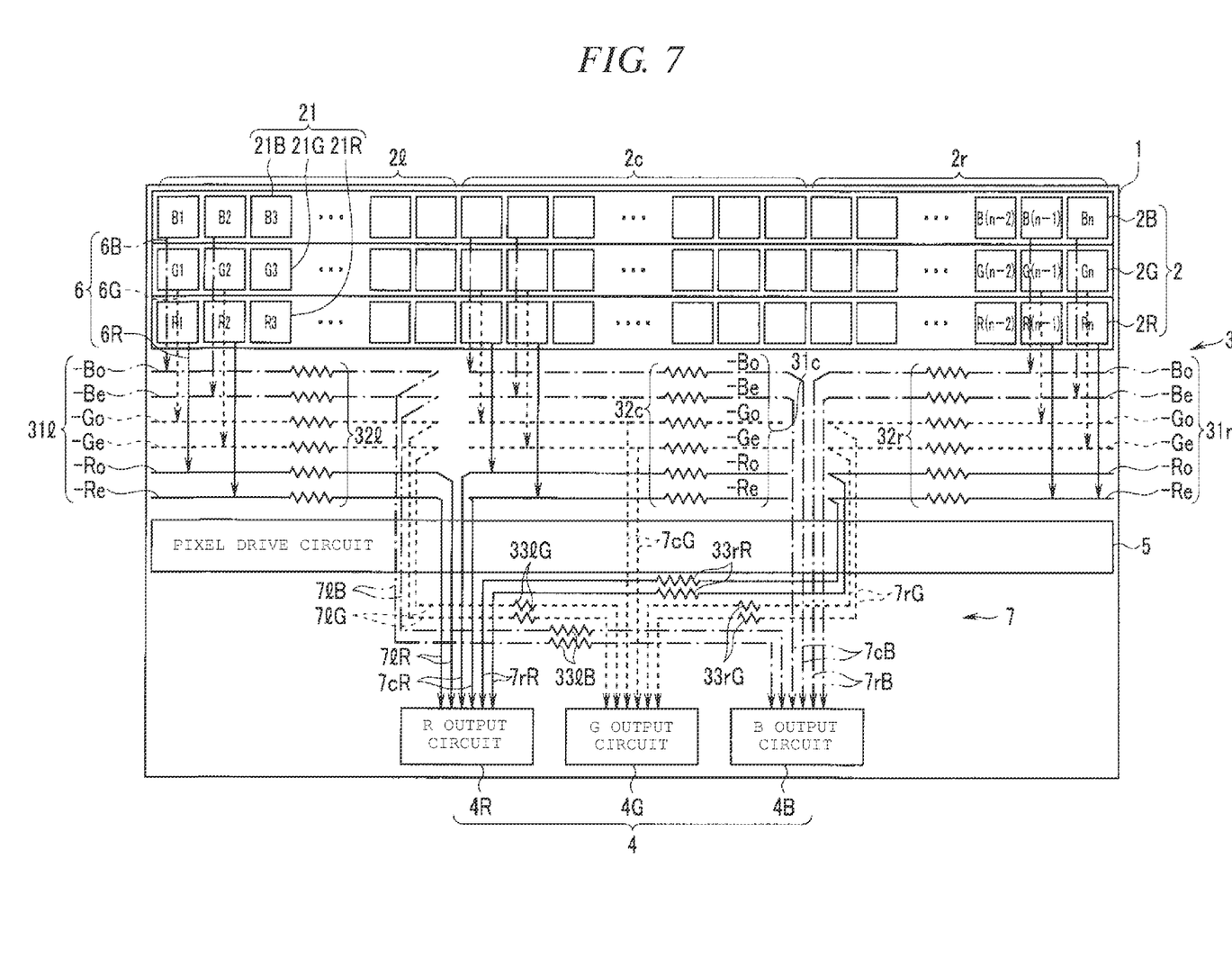
FIG. 7 is a diagram showing a configuration of a solid state image capturing device according to a modification example of the second embodiment.

FIG. 7 is a diagram showing a configuration of a solid state image capturing device 1 according to a modification example of the second embodiment.

In the modification example shown in FIG. 7, the R output circuit 4R is disposed between the division lines 31l and the division lines 31c in one direction, and the B output circuit 4B is disposed between the division lines 31c and the division lines 31r in one direction.

When this disposition is adopted, the lead-in lines 7cB and the lead-in lines 7rB can be linearly connected to the B output circuit 4B without bending into an L shape. Further, the lengths of the lead-in lines 7lB can be shortened as compared with the configuration in FIG. 3. As a result, the wiring resistance and parasitic capacitances of the lead-in lines 7cB and lead-in lines 7rB can be almost ignored, and then the wiring resistance and the parasitic capacitances 33lB of the lead-in lines 7lB can be reduced.

Similarly, the lead-in lines 7cR and the lead-in lines 7lR can be linearly connected to the R output circuit 4R without bending into an L shape. Further, the lengths of the lead-in lines 7rR can be shortened as compared with the configuration in FIG. 3. As a result, the wiring resistance and parasitic capacitances of the lead-in line 7cR and lead-in lines 7lR can be almost ignored, and then the wiring resistance and the parasitic capacitances 33rR of the lead-in lines 7rR can be reduced.

In this way, according to the modification example shown in FIG. 7, the delay of the output signal So can be further reduced as compared with the configuration shown in FIG. 3, and the read operation of the solid state image capturing device 1 can be speeded up.

It is noted that in the modification example shown in FIG. 7, the configuration of the three-dimensional wiring and the configuration in which the shield lines 8 are arranged may be applied.

Third Embodiment

Figure 8:
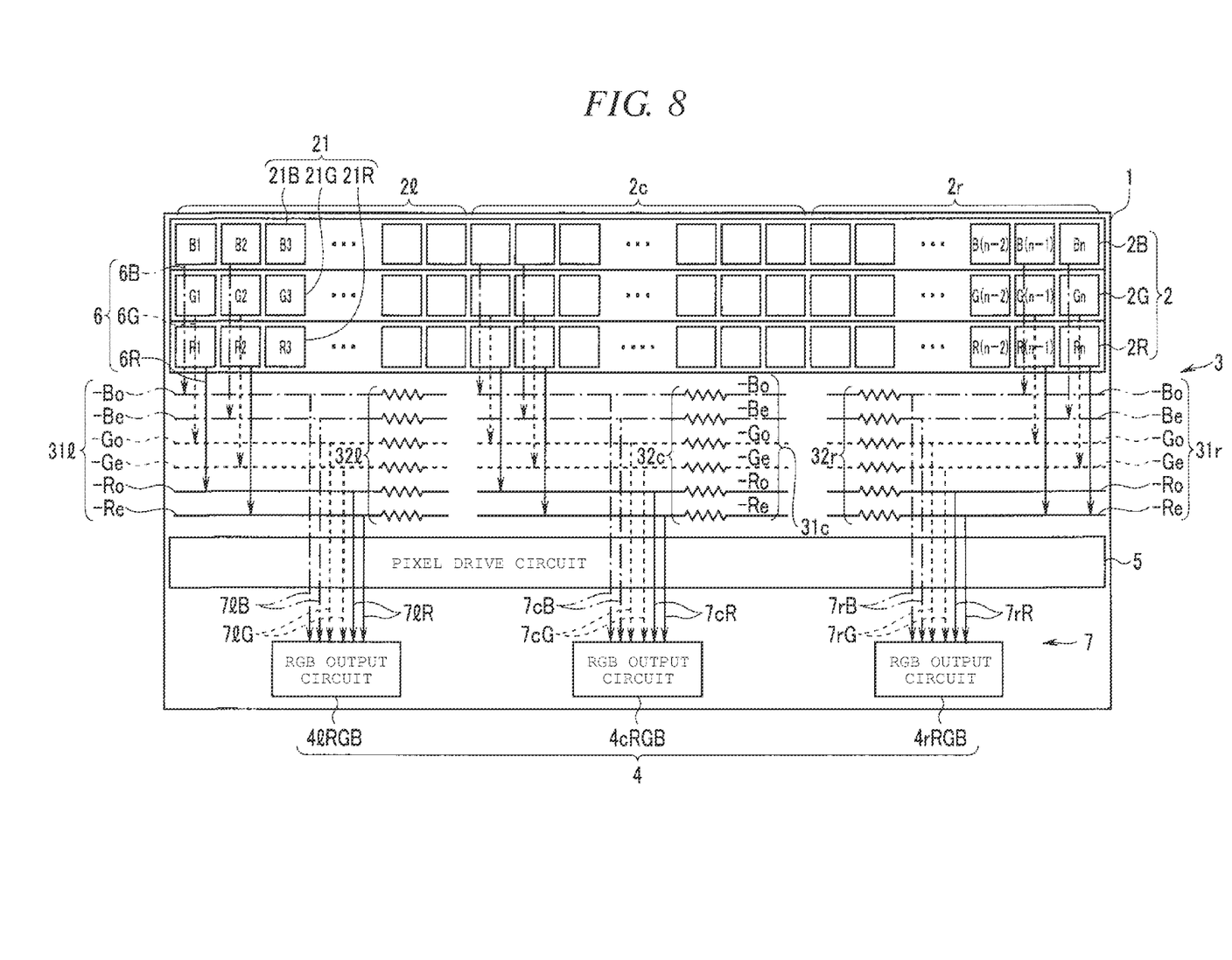
FIG. 8 is a diagram showing a configuration of a solid state image capturing device according to a third embodiment.

FIG. 8 is a diagram showing a configuration of a solid state image capturing device 1 according to a third embodiment. In the third embodiment, the same parts as those in the first and second embodiments are designated by the same reference numerals, the description thereof will be omitted, and the differences will be mainly described.

In the first and second embodiments, each of the output circuits 4 that amplifies the output signal So is provided for each color, and there are three output circuits 4: the B output circuit 4B, the G output circuit 4G and the R output circuit 4R. In contrast to this, in the present embodiment, the number of output circuits 4 is three which is the same as other embodiments, but all of the three output circuits 4 are configured to amplify the output signals So of the three colors (R, G, B).

Further, in the present embodiment, as in the second embodiment, the pixel portion 2 is divided into a pixel group 2l on the left side, a pixel group 2c in the center, and a pixel group 2r on the right side, and the common signal line 3 is divided into division lines 31l on the left side corresponding to the pixel group 2l, division lines 31c in the center corresponding to the pixel group 2c, and division lines 31r on the right side corresponding to the pixel group 2r, in one direction. Similar to the second embodiment, the division lines 31l, 31c, and 31r are parallelized to six for each color (RGB) and corresponding to whether the order is odd-numbered (o) or even-numbered (e).

Specifically, the output circuit 4 includes an RGB output circuit 41RGB that is disposed at a location corresponding to the center of the division lines 31l on the left side, an RGB output circuit 4cRGB that is disposed at a location corresponding to the center of the division lines 31c in the center, and an RGB output circuit 4rRGB that is disposed at a location corresponding to the center of the division lines 31l on the right side. The RGB output circuit 41RGB has the closest physical distance to the division lines 31l on the left side and the pixel group 2l, the RGB output circuit 4cRGB has the closest physical distance to the division lines 31c in the center and the pixel group 2c, and the RGB output circuit 4rRGB has the closest physical distance to the division lines 31r on the right side and the pixel group 2r.

The division lines 31l, which have two division lines with respect to each of the RGB colors, are connected to the RGB output circuit 41RGB via the lead-in lines 7lR, 7lG, and 7lB, each with two lead-in lines, respectively. The lead-in lines 7lR, 7lG, and 7lB, each with two lead-in lines, are connected to the RGB output circuit 41RGB at the shortest distance in a direction orthogonal to one direction, and the wiring resistance and the parasitic capacitances thereof can be almost ignored.

The division lines 31c, which have two division lines with respect to each of the RGB colors, are connected to the RGB output circuit 4cRGB via the lead-in lines 7cR, 7cG, and 7cB, each with two lead-in lines, respectively. The lead-in lines 7cR, 7cG, and 7cB, each with two lead-in lines, are connected to the RGB output circuit 4cRGB at the shortest distance in a direction orthogonal to one direction, and the wiring resistance and the parasitic capacitances thereof can be almost ignored.

The division lines 31r, which have two division lines with respect to each of the RGB colors, are connected to the RGB output circuit 4rRGB via the lead-in lines 7rR, 7rG, and 7rB, each with two lead-in lines, respectively. The lead-in lines 7rR, 7rG, and 7rB, each with two lead-in lines, are connected to the RGB output circuit 4rRGB at the shortest distance in a direction orthogonal to one direction, and the wiring resistance and the parasitic capacitances thereof can be almost ignored.

When m is a natural number, it is assumed that the number n of the pixels 21 arranged in each of the pixel rows 2B, 2G, and 2R is n=3m, the pixel group 2l on the left side includes the first to m-th pixels 21, the pixel group 2c in the center includes the (m+1)-th to 2m-th pixels 21, and the pixel group 2r on the right side includes the (2m+1)-th to 3m-th pixels 21.

In this case, the RGB output circuit 41RGB on the left side amplifies and outputs the output signals So in the order of, for example, B1, G1, R1, B2, G2, R2, . . . , Bm, Gm, Rm. The RGB output circuit 4cRGB in the center amplifies and outputs the output signals So in the order of, for example, B(m+1), G(m+1), R(m+1), B(m+2), G(m+2), R(m+2), . . . , B(2m), G(2m), R(2m). The RGB output circuit 4rRGB in on the left side amplifies and outputs the output signals So in the order of, for example, B(2m+1), G(2m+1), R(2m+1), B(2m+2), G(2m+2), R(2m+2), . . . , B(3m), G(3m), R(3m). At this time, by performing the read drive of the pixel groups 2l, 2c, and 2r using the pixel drive circuit 5 in parallel, for example, and by performing the output of the RGB output circuits 41RGB, 4cRGB, and 4rRGB in parallel, for example, the time required for outputting pixels is shortened.

It is noted that the read drive and output operation described here are examples, and other operations may be performed without limitation.

According to the third embodiment, since the present embodiment is almost the same as the second embodiment described above and the number of divisions of the common signal line 3 is larger than that of the first embodiment, the delay time when the output signal So is read can be shortened as compared with the first embodiment.

Further, since all of the three output circuits 41RGB, 4cRGB, and 4rRGB are configured to amplify the output signals So of the three colors (R, G, B), the lengths of all lead-in lines 7 can be minimized, and the wiring resistance and parasitic capacitances of the lead-in lines 7 can be minimized. As a result, the delay of the output signal So can be further reduced as compared with the second embodiment, and the read operation of the solid state image capturing device 1 can be speeded up.

Further, the wiring resistance and parasitic capacitances 32l of the division lines 31l, the wiring resistance and parasitic capacitances 32c of the division lines 31c, and the wiring resistance and parasitic capacitances 32r of the division lines 31r are basically the same in any RGB color and any even/odd order in the array. Further, as described above, the wiring resistance and parasitic capacitances of the lead-in lines 7 are minimized and can be ignored. That is, the wiring resistance and the parasitic capacitances on the path through which the output signals So from all the pixels are transported have almost the same value. Therefore, it is possible to acquire a high-level and high-quality image by minimizing the difference in output signal characteristics corresponding to the pixel location.

Further, since there is no intersection place between the lead-in lines 7 and there is no array portion (an array portion on the line A-B as shown in FIG. 3) in which the lead-in lines 7 are arranged side by side in a direction orthogonal to one direction, the output circuit 4 can be disposed close to the pixel drive circuit 5, and the area required for the wiring layout of the lead-in lines 7 can be reduced. Further, the configuration of the three-dimensional wiring as shown in FIG. 5 becomes unnecessary, and the manufacturing process of the solid state image capturing device 1 can be simplified as compared with the second embodiment. It is noted that the configuration in which the shield lines 8 are arranged between the lead-in lines 7 may be applied to the present embodiment.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A solid state image capturing device comprising:
   a plurality of pixels arranged in a plurality of pixel groups, each of the plurality of pixel groups extending along a first direction, adjacent pixel groups of the plurality of pixel groups that are adjacent in a second direction, orthogonal to the first direction, are configured to detect different characteristics of light incident on respective pixel groups of the adjacent pixel groups, the different characteristics of light being red, green, and blue colors, and wherein the plurality of pixels in each pixel group are configured to:
  generate a plurality of signal charges by photoelectrically converting incident light, and
  output a plurality of output signals corresponding to an amount of the plurality of generated signal charges of a respective pixel group;
a common signal line comprising a plurality of division lines, each of the plurality of division lines associated with a respective pixel group of the plurality of pixel groups and configured to transmit the plurality of output signals of the respective pixel group, and
an output circuit connected to the plurality of division lines, the output circuit configured to amplify the plurality of output signals, wherein
a first lead-in line among a plurality of lead-in lines is connected to a first division line among the plurality of division lines at a location closest to a respective output circuit of the first division line, and
a second lead-in line among the plurality of lead-in lines is connected to a second division line among the plurality of division lines at a location where the second lead-in line has the same length as that of the first lead-in line.

2. The solid state image capturing device according to claim 1, wherein
  the output circuit is connected to the plurality of division lines by the plurality of lead-in.

3. The solid state image capturing device according to claim 1, wherein the output circuit is connected to the plurality of division lines by a plurality of lead-in lines, and
  wherein two or more lead-in lines among the plurality of lead-in lines include an array portion in which the two or more lead-in lines are arranged side by side in a direction intersecting the first direction, and a shield line is disposed between the two or more lead-in lines, in the array portion.

4. The solid state image capturing device according to claim 1, wherein the output circuit is connected to the plurality of division lines by a plurality of lead-in lines, and
  wherein two or more lead-in lines among the plurality of lead-in lines include an array portion in which the two or more lead-in lines are arranged side by side in a direction intersecting the first direction, and the two or more lead-in lines are divided into a plurality of wiring layers and arranged in the array portion.

5. The solid state image capturing device according to claim 1, wherein:
  the plurality of pixels are arranged in a plurality of pixel rows,
  each pixel row in a given row of the plurality of pixel rows is configured to detect a same color of the red, green, and blue colors;
  a plurality of the common signal lines are provided, each of the plurality of common signal lines corresponding to one of the plurality of pixel rows;
  each of the plurality of the common signal lines is divided into a respective plurality of division lines corresponding to the plurality of pixel groups;
  a plurality of output circuits are provided corresponding to the red, green, and blue colors; and
  each output circuit of the plurality of output circuits receives the output signals transported by using the plurality of division lines, the division lines being obtained by dividing the common signal line related to a respective color of the red, green, and blue colors.

6. The solid state image capturing device according to claim 1, wherein:
  the plurality of pixels are arranged in a plurality of pixel rows,
  a plurality of the common signal lines are provided, each of the plurality of common signal lines corresponding to one of the plurality of pixel rows;
  each of the plurality of pixel rows is divided into the plurality of pixel groups;
  each of the plurality of the common signal lines is divided into a plurality of division lines corresponding to the plurality of pixel groups, each of the plurality of division lines being configured to transmit a respective output signal;
  a plurality of the output circuits are provided, each of the plurality of output circuits corresponding to one respective pixel group of the plurality of pixel groups,
  wherein each of the plurality of the output circuits is connected to the each of the plurality of pixel groups via a signal path extending from a location along a respective division line of a plurality of division lines closest to the respective output circuit, and
  wherein each of the plurality of the output circuits amplifies the respective output signals related to the red, green, and blue colors.

7. A solid state image capturing device comprising:
  a plurality of pixels arranged in a first direction and in a second direction orthogonal to the first direction and in a plurality of pixel groups, each pixel group being configured to detect a same color or red, green, and blue colors, the plurality of pixels are configured to:
    generate a plurality of signal charges by photoelectrically converting incident light, and
    output a plurality of output signals corresponding to an amount of the plurality of generated signal charges of a respective pixel group;
  a common signal line comprising a plurality of division lines, each of the plurality of division lines associated with a respective pixel group of the plurality of pixel groups and configured to transmit the plurality of output signals of the respective pixel group, and
  an output circuit connected to the plurality of division lines, the output circuit configured to amplify the plurality of output signals, wherein
  a first lead-in line among a plurality of lead-in lines is connected to a first division line among the plurality of division lines at a location closest to a respective output circuit of the first division line, and
  a second lead-in line among the plurality of lead-in lines is connected to a second division line among the plurality of division lines at a location where the second lead-in line has the same length as that of the first lead-in line.

8. The solid state image capturing device according to claim 7, wherein the output circuit is connected to the plurality of division lines by the plurality of lead-in lines.

9. The solid state image capturing device according to claim 7, wherein the output circuit is connected to the plurality of division lines by a plurality of lead-in lines, and
  wherein two or more lead-in lines among the plurality of lead-in lines include an array portion in which the two or more lead-in lines are arranged side by side in a direction intersecting a first direction, and a shield line is disposed between the two or more lead-in lines, in the array portion.

10. The solid state image capturing device according to claim 7, wherein the output circuit is connected to the plurality of division lines by a plurality of lead-in lines, and
wherein two or more lead-in lines among the plurality of lead-in lines include an array portion in which the two or more lead-in lines are arranged side by side in a direction intersecting a first direction, and the two or more lead-in lines are divided into a plurality of wiring layers and arranged in the array portion.

11. The solid state image capturing device according to claim 7, wherein:
the plurality of pixels are arranged in a plurality of pixel rows extending in one direction;
a plurality of the common signal lines are provided, each of the plurality of common signal lines corresponding to one of the plurality of pixel rows;
each of the plurality of pixel rows corresponding to the plurality of colors is divided into the plurality of pixel groups in the one direction;
each of the plurality of the common signal lines is divided into a respective plurality of division lines corresponding to the plurality of pixel groups;
a plurality of output circuits are provided corresponding to the plurality of colors; and
each output circuit of the plurality of output circuits receives the output signals transported by using the plurality of division lines, the division lines being obtained by dividing the common signal line related to a respective color of the plurality of colors.

12. The solid state image capturing device according to claim 7, wherein:
the plurality of pixels are arranged in a plurality of pixel rows, each row of the plurality of pixel rows corresponding to one of a plurality of colors;
a plurality of the common signal lines are provided, each of the plurality of common signal lines corresponding to one of the plurality of pixel rows;
each of the plurality of pixel rows is divided into the plurality of pixel groups;
each of the plurality of the common signal lines is divided into a plurality of division lines corresponding to the plurality of pixel groups, each of the plurality of division lines being configured to transmit a respective output signal;
a plurality of the output circuits are provided, each of the plurality of output circuits corresponding to one respective pixel group of the plurality of pixel groups,
wherein each of the plurality of the output circuits and the each of the plurality of pixel groups correspond to each other at a distance configured to reduce a delay time of each of the respective output signals, and
wherein each of the plurality of the output circuits amplifies the respective output signals related to the plurality of colors.

13. A solid state image capturing device comprising:
a plurality of pixels arranged in a plurality of pixel groups, each of the plurality of pixel groups associated with detecting a characteristic of light incident on a respective pixel group, the plurality of pixels in each pixel group configured to:
generate a plurality of signal charges by photoelectrically converting incident light, and
output a plurality of output signals corresponding to an amount of the plurality of generated signal charges of a respective pixel group;
a common signal line comprising a plurality of division lines, each of the plurality of division lines associated with a respective pixel group of the plurality of pixel groups and configured to transmit the plurality of output signals of the respective pixel group, and
an output circuit connected to the plurality of division lines by a plurality of lead-in lines, the output circuit configured to amplify the plurality of output signals, wherein
a first lead-in line among the plurality of lead-in lines is connected to a first division line among the plurality of division lines at a location closest to a respective output circuit of the first division line, and
a second lead-in line among the plurality of lead-in lines is connected to a second division line among the plurality of division lines at a location where the second lead-in line has the same length as that of the first lead-in line.

* * * * *